No. 7,960. J. JUDSON. POWER GOVERNOR. PATENTED MAR. 4, 1851.
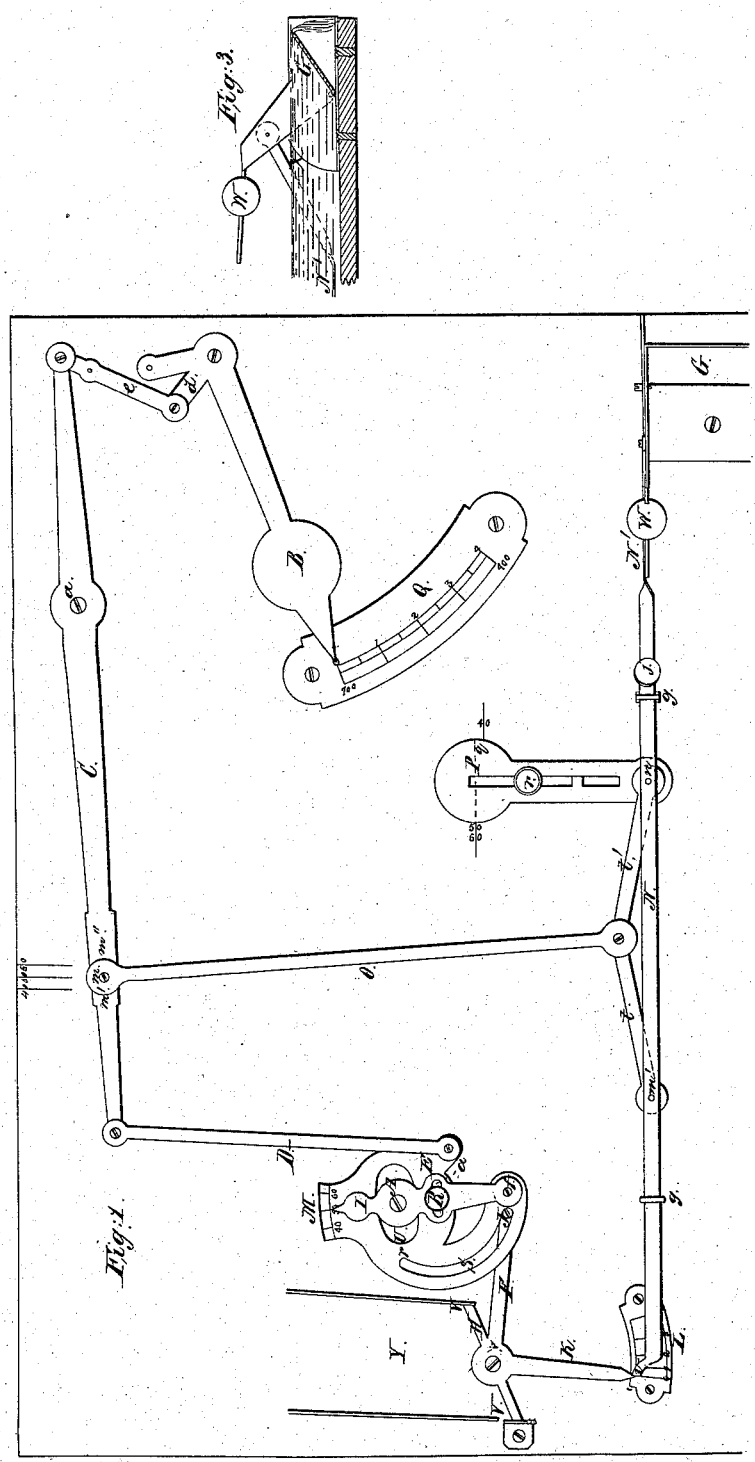

UNITED STATES PATENT OFFICE.

JUNIUS JUDSON, OF NEW YORK, N. Y.

POWER-GOVERNOR.

Specification forming part of Letters Patent No. 7,960, dated March 4, 1851; Reissued February 28, 1865, No. 1,889.

*To all whom it may concern:*

Be it known that I, JUNIUS JUDSON, of the city and county of New York and State of New York, have invented a new and useful Improvement in the Apparatus for Governing Mechanical Power, and that the following is a full, clear, and exact description thereof, reference being had to the accompanying drawings, which make part of this specification.

My principle of governing motive power applies to steam, water, and other agents. I suppose that there is a certain range of speed which may be allowed without detriment to the mechanical operations performed, but that the limits are restricted and that a pendulum governor rises and falls only through a limited vertical arc when regulating the supply of motive power to the machinery from one extreme to the other of its appropriate speed and that any other kind of governor is similarly limited in the range of speed governed. I also suppose that when the speed falls to its lowest admissible rate, the valve, gates, weir, &c., is entirely open, and when the speed has attained the highest rate, which safety allows, it will cause the governor entirely to close the apertures through which the motive power passes. From its highest to its lowest rate, the speed may vary, as is well known, either on account of increased or diminished resistance, that is the greater or less quantity of work to be done in a given time, or in consequence of diminished or increased force in the motive power such as the elasticity of steam or the supply of water. When from either of these causes speed has fallen below the medium and approaches the minimum rate the prompt restoration of the medium rate requires a rapid supply of power, but when from the reverse circumstances, that is either a diminution in the amount of work or an increase in the tension or force of the moving power the speed has risen to or near its maximum of safe action, a small change only in the rate of supply is adequate to bring back the speed rapidly to the proper medium for the new circumstances. It is not in this view supposed that the speed will be absolutely the same with heavy loads or low pressures of steam, &c., as it is with light loads or high pressures, but it is supposed that the rate of admitting the power will in either case be such as to meet with promptitude and to counteract any tendency to alternate slow and rapid actions of the machinery when no variation of the work takes place.

To accomplish the proper regulation I cause the valve, to move rapidly when regulating slow speeds, and slowly when regulating high speeds that is by a given number of degrees of vertical elevation of the bolts or arms of the governor when near the lowest point of the vertical movement they cause the valve or gate to open or close a proportionately large part of its whole opening, and on the other hand by the same number of degrees of elevation or depression near the upper part of this range, the governor is made to close or open a comparatively small part of the entire extent of valve-opening.

The following description of the drawings will make known the manner in which I effect the objects above specified.

In Figures 1 and 2 similar parts are referred to by the same letters. Both figures represent the same aparatus which I have devised to illustrate the action of my machine but in different positions of all the principal parts.

In Fig. 1, the valve H which regulates the passage of steam through the pipe Y, is seen to be closed, its two extremities being in contact with the valve seat V, V, and the water gate G is raised up so as to prevent the passage of water through the weir channel X. This position of the gate is more fully illustrated in the vertical section, Fig. 3, where G is the gate W a counter weight, and N' a connecting rod for drawing up and letting down the gate. In Fig. 2, the valve H and the gate G are both seen to be wide open.

B represents one of the balls of a pendulum governor, of which the vertical spindle is not shown. Q is a scale marking the different elevations to which the balls rise the lower extremity being marked 40° and the upper, 70°. The connecting pieces *d* and *e* connect the ball B with the lever C in such a manner that when B is at 70 the arm of the lever with which the connecting rods O and D are joined is depressed to its lowest point as seen in Fig. 1, and when B stands at 40° on the arc Q as in Fig. 2, other connecting rods are drawn up to the highest elevation.

E is a vibrating cam b, moved by the section of the connecting rod D. When D is depressed the comb comes into such a position that the pin or wrist J comes to the lower extremity of the eccentric slot S as in Fig. 1, thereby closing the valve H but when the ball B falls to 40° as in Fig. 2, the vibration of the cam drawn into the position there represented, causes the pin J to be found at the upper extremity of the slot S, and then the valve H is opened to its greatest extent.

Attached to the valve stem is an index rod K, which in Fig. 1 is seen to point to O on the scale L, and in this position also there is no opening of the valve H.

In Fig. 2, the index K, points to 4 the highest number on the scale L. The divisions on this scale are unequal, smallest from 0 to 1 and largest from 3 to 4. The scale Q over which the pointer on the ball B moves, is also seen to be divided into parts and numbered from 0 to 4. But the divisions are in this case equal. In the position of the apparatus seen in Fig. 1, the pointer of B is at the zero on Q and the index K at the zero on L by the motion of B from 0 to 1, 1 to 2, 2 to 3, &c., the index K will be made to pass successively over unequal and increasing spaces on the arc L showing that the valve H also opens unequally fast in the different parts of the range of its motion. By the same descending motion of the ball B from 0 to 4 on its scale Q, the elevation of the connecting rod O, from the position in Fig. 1, to that in Fig. 2, raises the two toggle joint arms or progressive levers $t$ and $t'$ from a nearly horizontal to a highly inclined position, and as the arm $t'$ of the toggle, has a fixed point or axis $n$, and the arm $t$ a movable axis $n$, on the bar N the change of position of the arms $t$ and $t'$ from the position in Fig. 1 to that in Fig. 2, causes the end $v$ of the bar N to recede from its position at the 0 point over the scale L, to that seen in Fig. 2; and by this motion of the bar the gate G is brought down from its inclined position in Figs. 1 and 3 to the horizontal one seen in Fig. 2. Owing to the progressive action of the toggle joint bars, the rate of motion of the lever N is less rapid near the zero point (Fig. 1) than near the opposite extremity of the scale where $v$ comes over 4 as in Fig. 2. It is easy to see that when instead of a gate a sliding valve is to be regulated the bar N and the toggle joint levers $t$, $t'$, may be used for that purpose. When both a steam engine and a water wheel are used in driving the same machinery, the cam and the toggle joint may be applied as herein represented, and both operated by the same governor.

In order to adapt the apparatus to the use of high and of low pressure steam the cam E is made adjustable by means of the index arm I, to different positions over the pressure arc M, on which are marks indicating the pressure of steam to which the action of the cam becomes adapted by setting the point of the arm I over the respective numbers. The point $f$ is when the adjustable bar is connected with the cam. By means of the slot $u$ and the regulator nut R, the point of the index I is made to assume the required position over the scale M. The axis A, will in consequence of the change of position of the index (from 40 to 60 for example) be carried farther away from the point $r$ of the slot S. In consequence of this change the total opening of the valve will be less when the governor balls are at their lowest position or when the governor, of whatever kind, is running at its lowest speed, than when the index I stands at 40 or at 50. The valve might for example have the position marked by the dotted line $o'$ instead of $o$ Fig. 2.

In order to adapt the actions of the gate G to those of the valve H when acting under different pressures of steam, the fulcrum $m$ of the connecting rod O may be transferred to the point $m'$ when the index I is set at 60 or to $m''$ when I stands at 60. At the same time the adjustable fulcrum support P, must be so set as to lower or raise the fulcrum $n$ so as to bring the cross line $q$ to correspond with the mark 40, 50, or 60, set upon the support to which the screw $v$ fastens the piece P. The numbers 50 and 60 shown on one and the same line indicate that between those ranges the support needs no change of position. With these adjustments the gate and valve will be made to act simultaneously and in such manner as to open rapidly near their open extremity and slowly near the closed extremity.

I have herein spoken of the action of revolving pendulum governors, and have explained the operation of my invention in connection with the rising and falling of the arms of that kind of governor, but I wish it to be understood that whatever be the kind of governor used to open and close the valve, I shall by applying my invention to transmit the action of the governor to the valve, gate, &c., to be governed cause the rate of opening or closing of the valve, &c., near the full open end to be rapid, and the rate of opening or closing near the closed end to be slow, so as to prevent those alternations of too slow and too rapid speed which arise from the causes herein explained. I wish it also to be distinctly understood that though I have herein described only the cam and the toggle joint apparatus as means of effecting the purpose of my invention, yet that any equivalent machinery having similar progressive actions may be substituted for the purpose of causing the action of the governor to affect the valve or other parts to be governed, rapidly at or near the open extremity and slowly at or near the closed extremity, as hereinbefore explained.

Having thus explained my improvement, what I claim as my invention and desire to secure by Letters Patent is—

1. Communicating the action of governors to the valves or other parts of machinery governed thereby, in such manner as to cause by accelerating or retarding the motion of said valves, large amounts of regulating power to be added to, or taken from the engine by a given change of the speed, when the motion of the engine becomes too much retarded, whether such retardation arises from increase of work or resistance, or from diminution of the tension of the moving force; and also small amounts of regulating power to be added to or taken from the engine by a like change of speed when the motion is too much accelerated, whether such acceleration arises from diminution of work or resistance, or from increase in the tension of the moving force as herein set forth.

2. I also claim connecting the valve arm or part to be regulated to the regulator by a cam or its equivalent having progressive rates of action, when the same is employed for transmitting the action of governors to the parts of machinery to be governed and for the purpose of causing the motions of valves, gates, weirs or other analogous parts, to take place rapidly for the regulation of low speed and slowly for the regulation of high speed substantially in the manner and for the purposes herein set forth.

3. I also claim making the eccentric curve of the vibrating cam to vary its position with respect to its center of vibration for the purpose of varying the rapidity and extent of opening of the valve, according to the pressure of steam in the manner herein set forth.

JUNIUS JUDSON.

Witnesses:
EDWD AVERELL,
JAMES LANGRIDGE.

[FIRST PRINTED 1913.]